United States Patent [19]

Gosdowski et al.

[11] Patent Number: 5,699,891
[45] Date of Patent: Dec. 23, 1997

[54] DEVICE FOR DISPLACING WORKPIECE CARRIERS

[75] Inventors: Gerhard Gosdowski, Bietigheim-Bissingen; Werner Arleth, Esslingen; Peter Ulmer, Urbach, all of Germany

[73] Assignee: Robert Bosch GmbH, Stuttgart, Germany

[21] Appl. No.: 582,252

[22] Filed: Jan. 3, 1996

[30] Foreign Application Priority Data

Jan. 4, 1995 [DE] Germany .................. 195 00 148.6

[51] Int. Cl.$^6$ .................................................. B65G 37/00
[52] U.S. Cl. ............................ 198/370.1; 198/465.1
[58] Field of Search ......................... 198/370.08, 370.1, 198/465.1, 465.2, 580, 803.01

[56] References Cited

U.S. PATENT DOCUMENTS

| | | | |
|---|---|---|---|
| 2,734,643 | 2/1956 | MacRae | 198/370.1 X |
| 3,104,004 | 9/1963 | Poel et al. | 198/370.1 X |
| 3,592,325 | 7/1971 | Sullivan et al. | 198/370.1 |
| 4,658,947 | 4/1987 | Welder | 198/370.1 X |
| 5,458,265 | 10/1995 | Hester et al. | 198/465.1 X |

FOREIGN PATENT DOCUMENTS

4430159A1  2/1996  Germany .

*Primary Examiner*—James R. Bidwell
*Attorney, Agent, or Firm*—Spencer & Frank

[57] ABSTRACT

Apparatus for displacing workpiece carriers from one conveying path to a further conveying path. The apparatus has a lifting device for the workpiece carrier arranged in a transfer zone with which the workpiece carrier can be transferred from the feeding conveyor path to the further conveyor path. The further conveyor path has at least one transport, where pulling run can be lifted and later lowered from the first place to a second place by the lifting device so that the pulling run of the transport belt can serve as a support for the workpiece carrier. Arranged at the end of a transport section of the further conveyor path in the transport zone, is at least one lifting-deflecting device deflecting a transport belt, which lifting-deflecting device can lift and lower the respective transport belt from the first plane to the second plane substantially by the same amount as the lifting device of the same transport belt.

12 Claims, 3 Drawing Sheets

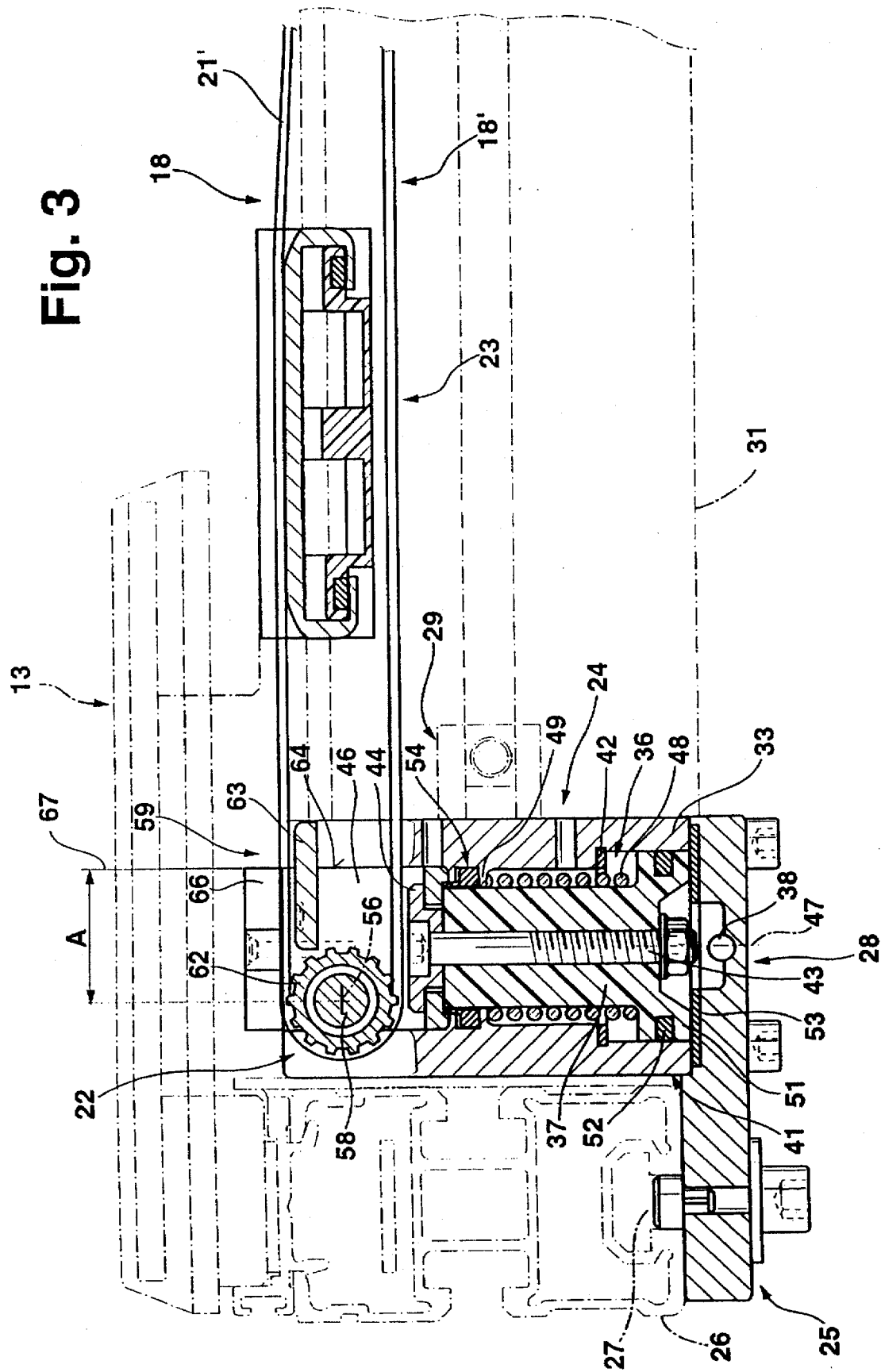

DEVICE FOR DISPLACING WORKPIECE CARRIERS

CROSS-REFERENCE TO RELATED APPLICATION

This application claims the priority of patent application Ser. No. P 1 95 00 148.6-22 filed in Germany on Jan. 4, 1995, the subject matter of which is incorporated herein by reference.

BACKGROUND OF THE INVENTION

The invention relates to an apparatus for displacing workpiece carriers, specifically to an apparatus for displacing workpiece carriers from one conveying path to a further conveying path, the apparatus having a lifting device for the workpiece carrier arranged in a transfer zone with which the workpiece carrier can be transferred from the conveyor path to the further conveyor path, and a conveyor path having at least one transport belt, which lifting device can be lifted and lowered from a first plane to a second plane onto a pulling run of the transport belt serving as a support for the workpiece carrier.

Such an apparatus is disclosed in the German application P 44 30 159.6, wherein a branch-off conveyor path is inserted into a linearly extending conveyor path, which is configured as a twin-belt conveyor, so as to be extending transversely to the linearly extending conveyor path. This branch-off conveyor path is also embodied as a twin-belt conveyor and its transport belts are adjacent to the feeding conveyor path at the end of the transport section. The linearly extending conveyor path has at least one lifting device on each transport belt with which a branch-off conveyor path of the linearly extending conveyor path can be moved from a first plane into a second plane.

The lifting devices are actuated when a workpiece carrier enters a transfer zone for displacement into the branch-off conveyor path so that the transport belts of the branch-off conveyor path act on the workpiece carrier and lower it by a few millimeters with respect to the feeding conveyor path so that the workpiece carrier is supported by the branch-off conveyor path and can be transported out of the transfer zone.

SUMMARY OF THE INVENTION

The apparatus for displacing workpiece carriers from a conveying path to a further conveying path according to the invention has, at the end of a transport section, at least one conveyor path which is provided with at least one lifting-deflecting device for deflecting the transport belts, which lifting-deflecting device can be lifted and lowered from the first plane to the second plane substantially by the same amount as the lifting device of the same transport belt.

The apparatus according to the invention represents a cost-efficient arrangement by means of which very small workpiece carriers in particular can be displaced reliably from a feeding conveyor path to a further branch-off conveyor path.

The apparatus according to the invention fully utilizes the entire available length of the transport belts of the conveyor paths, i.e., up to the lifting-deflecting device, so that the support region of the workpiece carrier can be made larger during transfer. Thus, the workpiece carrier is largely prevented from tilting over due to a deviation of the location of the center of gravity to a location other than the center of the workpiece carrier, which deviation may already occur when the load distribution is slightly one-sided: This allows a greater reliability of the operational process.

The apparatus according to the invention is especially advantageous for small workpiece carriers. The lifting devices, which are arranged in the branch-off conveyor path, can lift the workpiece carrier over a section which extends from the one end of the workpiece carrier supported on the branch-off conveyor path to just beyond the center of the workpiece carrier. The lifting-deflecting unit can also lift the deflecting roller by the amount of the lifting device so that the surface of the transport belt which acts on the workpiece carrier can be extended so that the end of the transport section can also be used for the transfer process.

The apparatus according to the invention can be modified in various ways. A particularly advantageous embodiment is the configuration of the lifting-deflecting device having a piston-cylinder unit which can be connected with a guide body so that it is possible to receive a deflecting body and to lift and lower the deflecting body in a guided manner over a defined path.

According to another advantageous feature, pressure can be admitted to the piston-cylinder unit, with a spring element being arranged coaxially with respect to a piston of the piston-cylinder unit; the spring element returns the piston to an initial position after the piston-cylinder unit has been relieved. This allows the apparatus to be of small size.

According to a further advantageous embodiment of the invention, the base body is provided with guide surfaces against which rests the guide body. In this way, the deflecting body can be guided during the lifting process and is able to simultaneously absorb the tensile forces which act on the deflecting body. These guide surfaces may be configured as slideways.

A particularly advantageous embodiment is one wherein the rotary axis of the deflecting body is arranged such that the rotary axis of the deflecting body is disposed with respect to the longitudinal axis of the piston-cylinder unit so as to be at least partially offset in the direction of the adjoining conveyor path when the lifting-deflecting device is installed. In this way, the length of the transport belt which rests against the workpiece carrier can be made larger during the take-over of the workpiece carrier so that the distance between the feeding conveyor path and a branch-off conveyor path can be reduced to a minimum.

BRIEF DESCRIPTION OF THE DRAWINGS

FIG. 3 is a sectional view on line III—III of FIG. 1.

DETAILED DESCRIPTION OF THE PREFERRED EMBODIMENT

Figure 1:
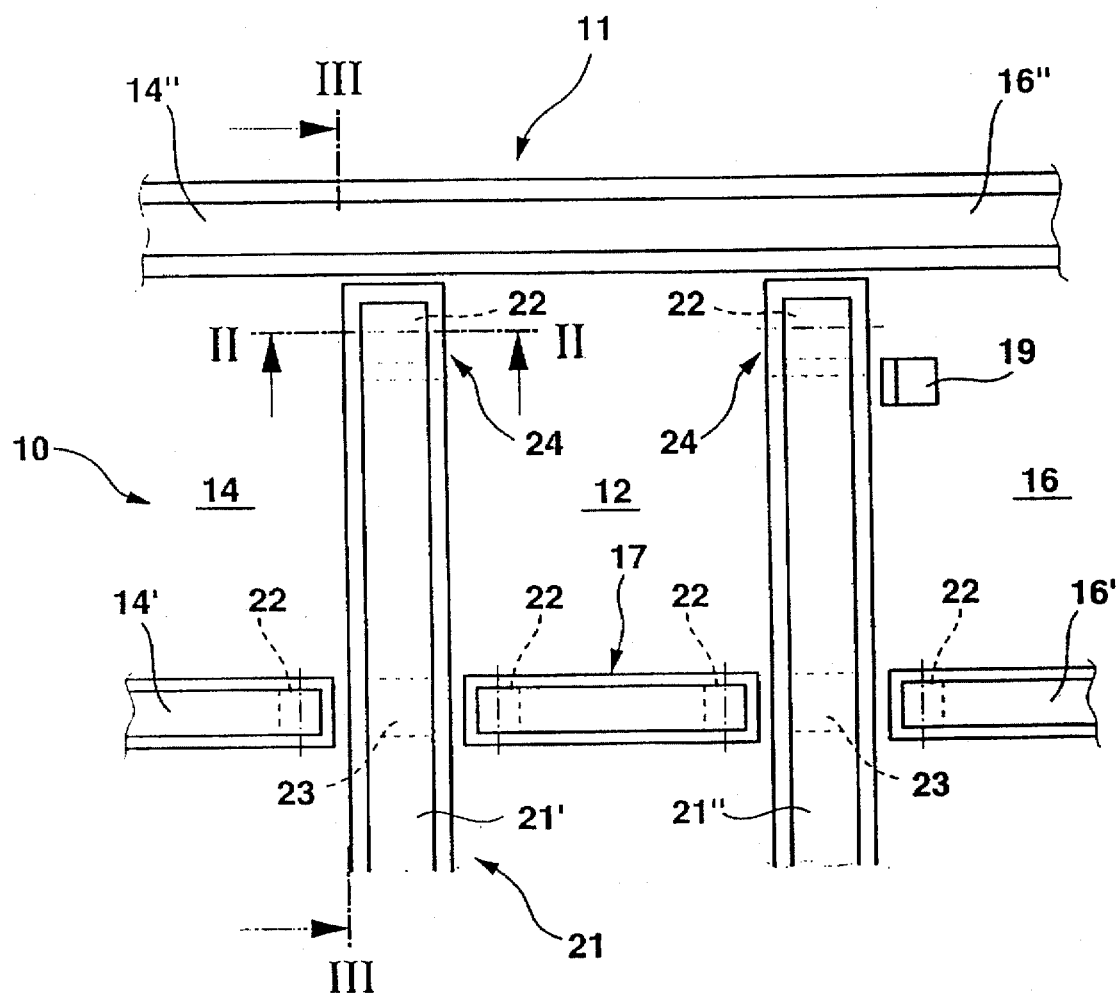
FIG. 1 is a plan view of a twin-belt conveyor system having a device according to the invention.
Figure 2:
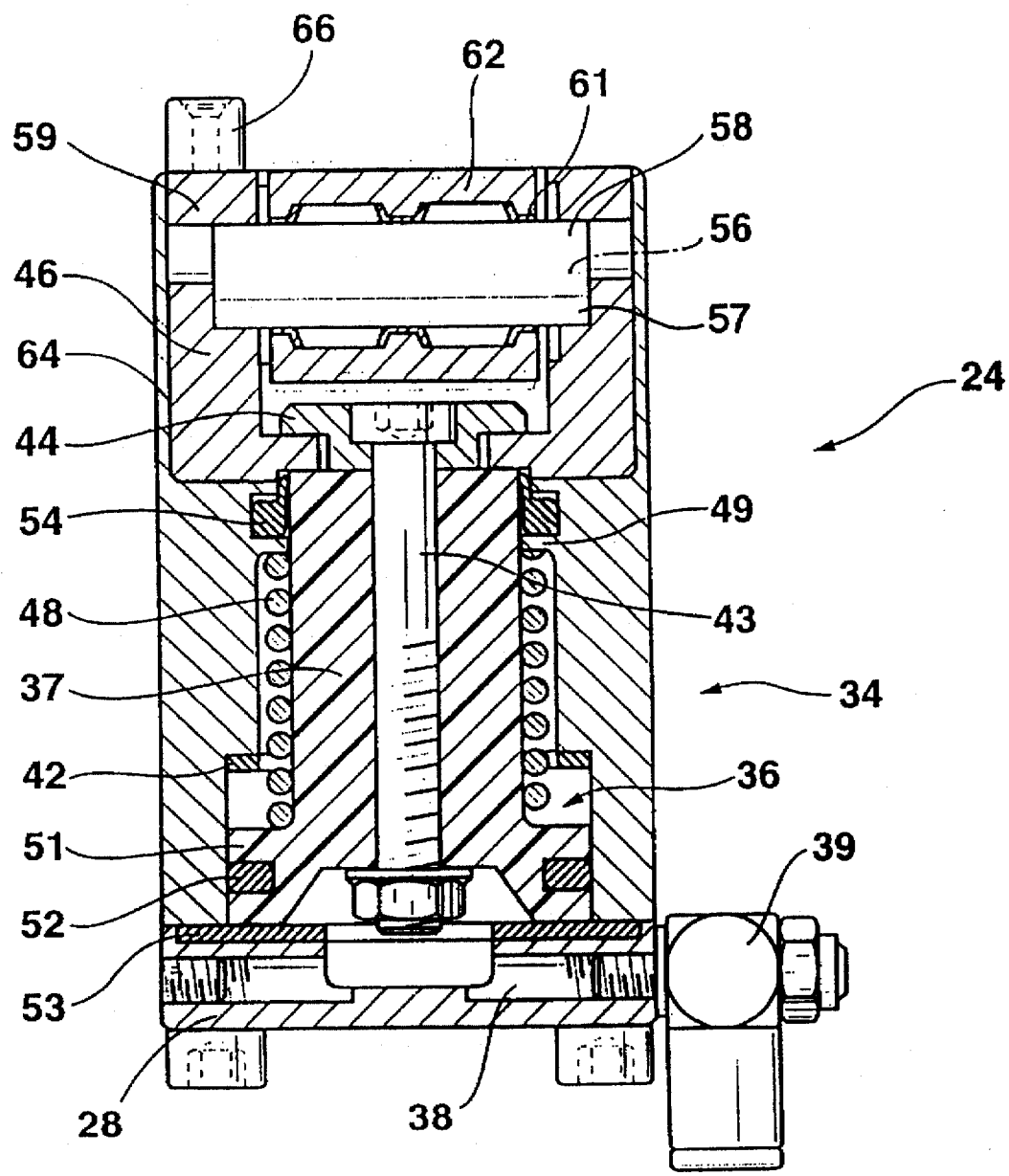
FIG. 2 is a sectional view on line II—II of FIG. 1.

FIG. 1 shows a twin-belt conveyor system 10 having a feeding main conveyor path 11 and a branch-off conveyor path 21 which is arranged transversely to the main conveyor path. The conveyor paths 11, 21 form a transfer zone 12 for workpiece carriers 13 in the intersecting point, as is shown in FIG. 2. The main conveyor path 11 is provided with a feeding conveyor path 14 having two transport belts 14', 14" extending in parallel side by side to one another and a discharging conveyor path 16 also having two transport belts 16' and 16" extending in parallel side by side to one another. The branch-off conveyor path 21 also has two transport belts 21' and 21" extending in parallel side by side to one another, with both transport belts 21' and 21" being arranged between the feeding conveyor path 14 and the discharging conveyor path 16. A conveyor path section 17 is provided between the transport belts 21, 21' of the branch-off conveyor path 21; this conveyor path section 17 connects the transport belt 14' of the feeding conveyor path 14 with the transport belt 16' of the discharging conveyor path 16. This conveyor path section 17 may be embodied as a roller conveyor or belt conveyor.

At the ends of the conveyor paths 14, 16, 21, the transport belts 14', 14", 16', 16", 21', 21" are guided via deflecting or drive rollers 22. Each transport belt 14', 14", 16', 16", 21', 21" has a pulling run 18 and an idle run 18', with the workpiece carrier 13 being supported by the pulling run 18, as shown in FIG. 3. Below the pulling run 18 of the transport belts 21' and 21", for example, the respective lifting devices 23 which lift and lower the respective pulling run 18 are disposed.

The discharging conveyor path 16 is also provided with a stop device 19 which is embodied such that the workpiece carrier 13 selectively either executes a linear travel or the workpiece carrier 13 is made to stop in the transfer zone 12. During this process, the workpiece carrier 13 is positioned in the transfer zone 12 such that it is disposed above the transport belt 21', 21". The width of the conveyor paths 11, 21 is determined by the dimensions of the workpiece carrier 13. The transport belts 14', 14" of the feeding conveyor path 14 and the transport belts 16', 16" of the discharging conveyor path 16 are located in a plane which is disposed, for example, 2 millimeters above the plane of the transport belts 21', 21" of the branch-off conveyor path 21. The lifting devices 23 acting upon the transport belts 21', 21" are set in such a way that the transport belts 21', 21" can be lifted above the plane of the transport belts 14', 14", 16', 16", 17. The transport belts 21', 21" are wrapped around deflecting bodies 22 which are part of lifting-deflecting devices 24 and the belts are set so as to have the same effect as the lifting device 23 so that the lifting-deflecting devices 24 can lift the deflecting body or the deflecting bodies 22 by the same amount as the lifting devices 23. In this way, the workpiece carrier 13 disposed in the transfer zone 12 is lifted off the transport belts 14', 14", 17 by means of the transport belts 21', 21" and is transported out of the transfer zone 12. After transfer zone 12, the transport belts 21', 21" transition from the second plane into the first plane and are carried away along the branch-off conveyor path 21. One of the branch-off conveyor paths 21 may also be embodied as a roller path. The arrangement of the conveyor paths 14, 16, 21 is also shown only by way of example. Further combinations and modifications are possible with these lifting-deflecting devices 24.

FIG. 2 shows a cross section of the entire lifting-deflecting device 24 which is provided with a base body 33 having, for example, a piston-cylinder unit 34 with a cylinder 36 and a piston 37. The cylinder 36 is connected to a compressed air supply 39 by way of a channel which is placed into the mechanical intersecting point 28.

The piston 37 has a lower annular guide section 51 and an upper guide section 54. A seal 52 is provided in the lower guide section 51 which hermetically seals the piston 37 toward the bottom in combination with a seal 53 which is arranged between the lifting-deflecting device 24 and the mechanical intersecting point 28. The upper guide section 54 is formed by an inserted sliding ring or the like.

The piston 37 is shown in a lifting position which corresponds to the first plane. As soon as pressure is admitted to the piston 37, the piston executes a lifting motion until it comes to rest against a support ring 42 of the cylinder 36, with this lifting position corresponding to the second plane. The piston 37 has a through-bore in which a tension rod 43 fixes a thrust piece 44 to the piston 37, with the thrust piece 44, in turn, fastening a guide body 46 to the piston 37. Recesses 57 are provided on this guide body 46, which recesses are intended to receive the deflecting roller 22. The deflecting body 22 has a roller body 62 which is rotatably seated on an axle 58 via roller bearings 61. The axle 58 can be arranged in the recesses 57 and can be fastened to the guide body 46 by means of a yoke 59.

The yoke 59 is connected to the guide body 46 by way of a screw connection so as to be detachable. This makes it easy to replace the deflecting roller 22. The yoke 59 is provided with a transport belt guide section 63 (FIG. 3) pointing toward the pulling run 18 so that an additional support is created in the lifting position of the lifting-deflecting device 24 by the transport belt guide section 63.

The guide body 46 is provided with guide surfaces 64 which rest against the base body 33. In this way, the deflecting roller 22 can be guided reliably both in a first plane and also in a second plane. On the upper side of the yoke 59, a workpiece carrier guide element 66 can be attached, for example, via a screw connection. It may also be possible to fasten the yoke 59 to the guide body 46 by means of this screw connection. The workpiece carrier guide element can be attached to the yoke only in branch-offs, with the workpiece carrier guide element 66 being mounted either to the right or to the left of the deflecting roller 22, depending on the application. No workpiece carrier guide element 66 is needed for further branches.

FIG. 3 shows a detail of a conveyor path frame 25 of the twin-belt conveyor 10. The conveyor path frame 25 is formed by a profiled support 26 of the main conveyor path 11. The profiled support 26 has a longitudinal groove 27 to which the mechanical intersecting point 28 can be fastened by means of a screw/clamp connection or the like. This mechanical intersecting point 28 receives the lifting-deflecting device 24 which directly adjoins the profiled support 26 with one end face 41. Opposite of the profiled support 26, the lifting-deflecting device 24 is provided, for example, with two connecting elements 29 which engage a belt-guiding profile 31 of the branch-off conveyor path 21 and can be fastened there.

The base body 33 of the lifting-deflecting device 24 is profiled such that it corresponds to the belt-guiding profile 31 in height and width and can be connected in a simple manner with the mechanical intersecting point 28 via a screw connection and rests with an end face 41 against the profiled support 26 of the main conveyor path 11.

The rotary axis 56 of the deflecting roller 22 is offset with respect to the longitudinal axis 47 of the lifting-deflecting device 24 toward the profiled support 26. The effective transport section of the transport belts 21', 21" can be placed closer to the profiled support 26 so that the workpiece carrier 13 can be supported by the pulling run 18 in the region of the rotary axis 56 of the deflecting roller 22.

The operation of the device according to the invention is will be explained byway of FIG. 1 and 3:

When a workpiece carrier 13 enters the transfer zone 12, the stop device 19 is actuated for a preprogrammed displacement into the branch-off conveyor path 21; the stop device brings the workpiece carrier 13 to a halt at the transfer zone 12. After stopping in this position, the lifting-deflecting device 24 is actuated, i.e., pressure is admitted to the piston-cylinder unit 34 of the lifting-deflecting device 24 and the cylinder-piston unit is transferred from the first plane into the second plane; during this process, the piston 37 is pushed into the second plane against the spring force of the spring element 48. Pressure is also admitted to the lifting devices 23 which are transferred into the second plane. During this process, the total lift may comprise, for example, 6 mm so that the transport belts 21', 21" can be lifted from a first plane, which is disposed approximately 3 mm below the plane of the transport belts 14', 14", into a second plane, which may be disposed approximately 3 mm above the plane of the transport belts 14', 14" but whose size is at least sufficiently large so that the workpiece carrier 13 can be transferred in a straight position. Due to the lifting of the deflecting roller 22 into the second plane, the transport belt 21', 21" can engage the workpiece carrier 13 by an amount A, which is outside of the center of the workpiece carrier 67, as a result of which the transfer of the workpiece carrier 13 is stabilized. The amount A engages approximately one third of the half of the workpiece carrier 13 which is additionally engaged by the transport belt 21', 21". In this manner, the shifting of the location of the center of gravity to a location other than the center of the workpiece carrier 67 due to a slight one-sided load distribution can be absorbed so that the workpiece carrier 13 cannot tilt over in the direction of the profiled support 26. During the carrying-off process, the transport belt guide section 63 of the yoke 59 now has an additional supporting effect on the pulling run 18 so that the workpiece carrier 13 can be engaged reliably by the transport belts 21', 21" in the upper lifting position.

Following the engagement of the workpiece carrier 13, the workpiece carrier 13 is led out of the transfer zone 12. The piston-cylinder units 34 are relieved so that the lifting device 23 and the lifting-deflecting device 24 are returned to their initial position and the transport belts 21', 21" are again positioned in the first plane.

Apart from the described application in a twin-belt conveyor system, the apparatus according to the invention may also be used in other transport systems for workpieces or workpiece carriers which may be comprised, for example, of a combination of belt and roller conveyor path systems.

It will be understood that the above description of the present invention is susceptible to various modifications, changes and adaptations, and the same are intended to be comprehended within the meaning and range of equivalents of the appended claims.

What is claimed is:

1. Apparatus for displacing workpiece carriers from one conveying path to a further conveying path, the apparatus having a lifting device for the workpiece carrier arranged in a transfer zone with which the workpiece carrier can be transferred from the feeding conveyor path to the further conveyor path; the further conveyor path having at least one transport belt, which the lifting device can lift and lower from a first plane to a second plane, so that a pulling run of the at least one transport belt can serve as a support for the workpiece carrier; and said further conveyor path, having at the end of a transport section and within said transfer zone, at least one lifting-deflecting device for deflecting the respective at least one transport belt, which lifting-deflecting device can lift and lower the at least one transport belt from the first plane to the second plane substantially by the same amount as the lifting device for the same transport belt.

2. Apparatus according to claim 1, wherein the lifting device and the lifting-deflecting device allocated to the same transport belt can be lifted and lowered synchronously.

3. Apparatus according to claim 1, wherein the lifting-deflecting device has a base body having at least one piston-cylinder unit with a piston and a cylinder and a guide body is provided which acts on the piston, which guide body receives a deflecting body around which the transport belt is wrapped and a pulling run of the transport belt can be lifted and lowered.

4. Apparatus according to claim 3, wherein pressure can be admitted to the piston on one side, and further comprising at least one spring element arranged in the piston-cylinder unit.

5. Apparatus according to claim 4, wherein said spring element is arranged coaxially with respect to the piston.

6. Apparatus according to claim 3, wherein the base body at least partially surrounds the deflecting body and has at least one guide surface which cooperates with the guide body.

7. Apparatus according to claim 3, wherein the deflecting body has an axle which can be arranged in the guide body and which can be fastened by a yoke attachable to the guide body, said yoke being a transport belt guide section which is disposed opposite of the axle and which guides the pulling run.

8. Apparatus according to claim 7, wherein the yoke is detachably connectible to the guide body and that at least one workpiece carrier guide element is attachable to the yoke.

9. Apparatus according to claim 8, wherein the workpiece carrier guide element and the yoke are connectible by a screw connection.

10. Apparatus according to claim 1, wherein the lifting-deflecting device has at least one connecting element which acts on a belt guiding profile of the further conveyor path, and wherein the lifting-deflecting device is attachable at a mechanical intersecting point which, in turn, is connectible to at least one profiled body of the feeding conveyor path.

11. Apparatus according to claim 9, further comprising, a compressed air supply attachable at the mechanical intersecting point, which compressed air supply is connectible to the piston-cylinder unit via at least one channel.

12. Apparatus according to claim 3, wherein the deflecting body of the lifting-deflecting device has a rotary axis which is offset with respect to the longitudinal axis of the piston-cylinder unit toward the feeding conveyor path when the lifting-deflecting device is installed.

* * * * *